(12) United States Patent
Guo et al.

(10) Patent No.: US 6,950,398 B2
(45) Date of Patent: Sep. 27, 2005

(54) IP/MPLS-BASED TRANSPORT SCHEME IN 3G RADIO ACCESS NETWORKS

(75) Inventors: Yile Guo, Woburn, MA (US); Zoe Antoniou, Watertown, MA (US); Sudhir Dixit, Weston, MA (US)

(73) Assignee: Nokia, Inc., Irving, TX (US)

(*) Notice: Subject to any disclaimer, the term of this patent is extended or adjusted under 35 U.S.C. 154(b) by 843 days.

(21) Appl. No.: 09/934,073

(22) Filed: Aug. 22, 2001

(65) Prior Publication Data

US 2003/0039246 A1 Feb. 27, 2003

(51) Int. Cl.[7] .............................................. H04L 12/28
(52) U.S. Cl. ...................... 370/235; 370/352; 370/389; 370/392; 370/396; 370/409
(58) Field of Search ................................ 370/349, 351, 370/352, 354, 389, 392, 396, 397, 400, 409, 229, 235, 328, 466, 474

(56) References Cited

U.S. PATENT DOCUMENTS

| | | |
|---|---|---|
| 5,996,021 A | 11/1999 | Civanlar et al. |
| 6,336,129 B1 | 1/2002 | Ise et al. |
| 6,341,127 B1 | 1/2002 | Katsube et al. |
| 6,408,001 B1 | 6/2002 | Chuah et al. |
| 6,587,457 B1 * | 7/2003 | Mikkonen .................. 370/356 |
| 2002/0105922 A1 * | 8/2002 | Jabbari et al. ............. 370/328 |
| 2002/0152319 A1 * | 10/2002 | AMin et al. ................ 709/232 |
| 2003/0177245 A1 * | 9/2003 | Hansen ....................... 709/228 |

OTHER PUBLICATIONS

TR 25.933 .2.0 (Aug. 2000) Technical Specifications; 3rd Generation Partnership Project (3GPP); Technical Specification Group (TSG) RAN: IP Transport in UTRAN Work Task Technical Report.
IP in the RAN as a Transport Option in 3rd Generation Mobile Systems Technical Report MTR–006 Release v2.0.0, Jun. 18, 2001.
R. Callon et al., "A Framework for Multiprotocol Label Switching", May 21, 1998.
Eric C. Rosen et al., "Multiprotocol Label Switching Architecture", Network Working Group, Feb. 1999.
Arun Viswanathan, et al., "Evolution of Multi–Protocol Label Switching".
Francois Le Faucheur et al., "MPLS Support of Differentiated Services", IETF Internet Draft, Aug. 2000.

* cited by examiner

*Primary Examiner*—Steven Nguyen
*Assistant Examiner*—Roberta Shand
(74) *Attorney, Agent, or Firm*—Banner & Witcoff, Ltd.

(57) ABSTRACT

A transport scheme is provided based on Internet protocol (IP) and multiprotocol label switching (MPLS) technology for third generation (3G) radio access networks (RAN). Label switched paths are established and managed for interconnecting base stations and radio network controllers. The process incorporates constraint-based routing and Diffserv to provide transport bearers that can support bandwidth provisioning and a variety of QoS requirements in the RAN.

19 Claims, 9 Drawing Sheets

IP/MPLS-BASED TRANSPORT SCHEME IN 3G RADIO ACCESS NETWORKS

FIELD OF THE INVENTION

The present invention provides a transport scheme based on Internet protocol (IP) and multiprotocol label switching (MPLS) technology for third generation (3G) radio access networks (RAN). Label switched paths are established and managed for interconnecting base stations and radio network controllers.

DESCRIPTION OF THE RELATED ART

Mobile communication systems have gone through a few generations. The second-generation (2G) system provides circuit-switched voice and data services. The next generation (2.5G) system provides low-rate packet-switched data service of up to 64 Kbps. However, voice and low-rate data services are insufficient in a world where high-speed Internet access is taken for granted. The trend is toward global information networks that offer flexible multimedia information services to users on demand-anywhere, and at any time. In order to support these requirements, the third-generation mobile communication system (3G) provides a higher data rate of up to 2 Mbps, while making more efficient bandwidth use.

A mobile communication system can be divided into two segments: a radio access network (RAN) that performs air-interface related functions and a core network (CN) that performs switching functions and interfaces to external networks such as the Internet or a public-switched telephone network. The third-generation mobile communication system (3G) provides improvements in both the radio access network RAN and the core network CN. The new air interface standards include WCDMA and cdma2000-1X. The corresponding wireless networks are UMTS and cdma2000.

In the core network CN the General Packet Radio Service (GPRS) is an enhancement to the so-called Global System for Mobile Communication (GSM) and provides packet data services to GSM subscribers. GPRS aims at making efficient use of GSM radio resources for bursty packet data transfer. This is in contrast to conventional circuit switched data services currently available in GSM. Presently, the GPRS network is based on GPRS Tunneling Protocol (GTP) using the well-known User Datagram Protocol/Internet Protocol (UDP/IP) or Transmission Control Protocol/Internet Protocol (TCP/IP) network which supports only best-effort service. The GPRS has GPRS Support Nodes (GSNs), namely one or more Serving GPRS Support Nodes (SGSN) and one or more Gateway GPRS Support Nodes (GGSN) in order to support packet data services.

In contrast to the single (best effort) level of service provided by the GPRS, the Universal Mobile Telecommunications System (UMTS), based on the GPRS network architecture described above, defines four different quality of service (QoS) or traffic. These classes are the conversational class, the streaming class, the interactive class and the background class. The main distinguishing factor between these classes is the delay sensitivity of each type of traffic. The conversational class is meant for very delay sensitive traffic, whereas the background class is the most delay insensitive traffic class. The conversational and streaming classes are used to carry real-time traffic flows. Conversational real-time services, like video telephony, are the most delay sensitive applications and those data streams should be carried in the conversational class. The interactive and background classes are used by traditional Internet applications like World Wide Web (WWW), Email, Telnet, File Transfer Protocol (FTP) and News.

In what is termed the Third Generation Partnership Project (3GPP), Wideband Code Division Multiple Access (WCDMA) is selected as the major air interface standard. A radio access network for WCDMA is called UMTS Terrestrial Radio Access Network (UTRAN). The UTRAN consists of base stations (BSs) and radio network controllers (RNCs). It allows for flexible network topology so that BSs and RNCs can be connected by a routed network. It also supports WCDMA radio functions such as macrodiversity, soft-handoff, outer loop power control, packet scheduling, radio channel allocation etc., and ensures the fast and reliable transport of both signaling and traffic between BSs and RNCs in the UTRAN.

In addition to WCDMA, General Packet Radio Service (GPRS)/Enhanced Data for GSM Evolution (EDGE) is also selected as the alternative air interface standard in 3GPP. The radio access network for GPRS/EDGE is called GPRS/EDGE Radio Access Network (GERAN). Similarly to UTRAN, it is necessary to ensure the fast and reliable transport of both signaling and traffic between the base stations (BSs) and base station controllers (BSCs) in GERAN.

In what is termed the third generation partnership project 2 (3GPP2), cdma2000 is selected as the air interface standard. The radio access network for cdma2000 is called 3GPP2 RAN. Similarly to UTRAN, it is necessary to ensure the fast and reliable transport of both signaling and traffic between the base stations (BSs) and base station controllers (BSCs) in the 3GPP2 RAN. Therefore it is important (and not provided by prior art systems) to develop transport techniques that can meet QoS requirements of 3GPP2 RAN while efficiently utilizing bandwidth resources in the radio access network.

In summary, 3G radio access networks, including UTRAN, GERAN, and 3GPP2 RAN, impose stringent requirements on the transport bearers. In terms of QoS, this translates to tight end-to-end control of delay and jitter, and almost zero packet loss ratio.

In 3GPP, currently a transport scheme based on Asynchronous Transfer Mode (ATM)/ATM Adaptation Layer 2 (AAL2) technology is specified for UTRAN. In 3GPP, currently no packet-switching based transport scheme is specified for GERAN. Also, in 3GPP2, currently no packet-switching based transport scheme is specified for 3GPP2 RAN.

It is a drawback of prior art systems that these systems cannot handle the diverse QoS requirements of the applications themselves (such as real time or non real time) when combined with the requirements imposed by advanced radio control functions (such as soft handover and power control in CDMA systems). The prior art systems do not adequately provide the transport technologies that can provide differentiated quality of services to multiple classes of traffic. The transport bearers need to support a variety of QoS requirements (delay, jitter, packet loss, etc.) and traffic characteristics (streaming, bursty, etc.). Other transport requirements, which are not adequately provided by the prior art include efficiency (i.e. reduction in protocol overhead), in-sequence packet delivery and connection identification of the air interface channels. While ATM/AAL2 transport scheme can support QoS requirements in UTRAN, it requires deployment of ATM switches and other equipment in both BSs and RNCs. This may not be the preferred solution for many 3G operators, who have a strong interest in fast and reliable transport technology for 3G radio access networks, without having to deploy ATM equipment. While ATM/AAL2 transport scheme can support QoS requirements in UTRAN, it requires deployment of ATM switches and other equipment in both BSs and RNCs. This may not be the preferred solution for many 3G operators, who require fast and reliable transport technology for 3G radio access networks, without having to deploy ATM equipment.

SUMMARY OF THE INVENTION

The present invention provides a transport scheme based on Internet protocol (IP) and multiprotocol label switching (MPLS) technology for third generation (3G) radio access networks (RAN). Label switched paths are established and managed for interconnecting base stations and radio network controllers. This scheme incorporates constraint-based routing and Diffserv to provide transport bearers that can support bandwidth provisioning and a variety of QoS requirements in the RAN.

One embodiment of the invention provides a method of transporting information in radio protocol frames in an MPLS (multiprotocol label switching) based transport network, comprising the steps of: setting up at least one label switching path having at least one label switching router, the at least one label switching path being a connection between a base station and a radio network controller, at least one of the base station and the radio network controller having a plurality of traffic classes; encapsulating radio protocol frames in MPLS packets; and forwarding the packets over the at least one label switching path using label switching to thereby carry the multiple classes of traffic via the at least one label switching path.

Another embodiment provides a system including the following components: a computer including a storage for storing data and instructions and a processor for executing instructions stored in the storage. The storage contains instructions corresponding to: a setup component that establishes a single label switching path having at least one label switching router, the label switching path connecting a base station to a radio network controller, a respective one of the base station and radio network controller having a plurality of traffic classes of traffic; a marking component that marks a field of a MPLS header at a label switch router at an ingress to the label switching path to identify the traffic classes of traffic being carried by the respective one of the base station and radio network controller; and a packet forwarding component that forwards the traffic within the label switching path based on the marked field.

BRIEF DESCRIPTION OF THE DRAWINGS

The present invention is illustrated by way of example and not limited by the accompanying figures in which like reference numerals indicate similar elements and in which.

DESCRIPTION OF THE PREFERRED EMBODIMENTS

Figure 1:
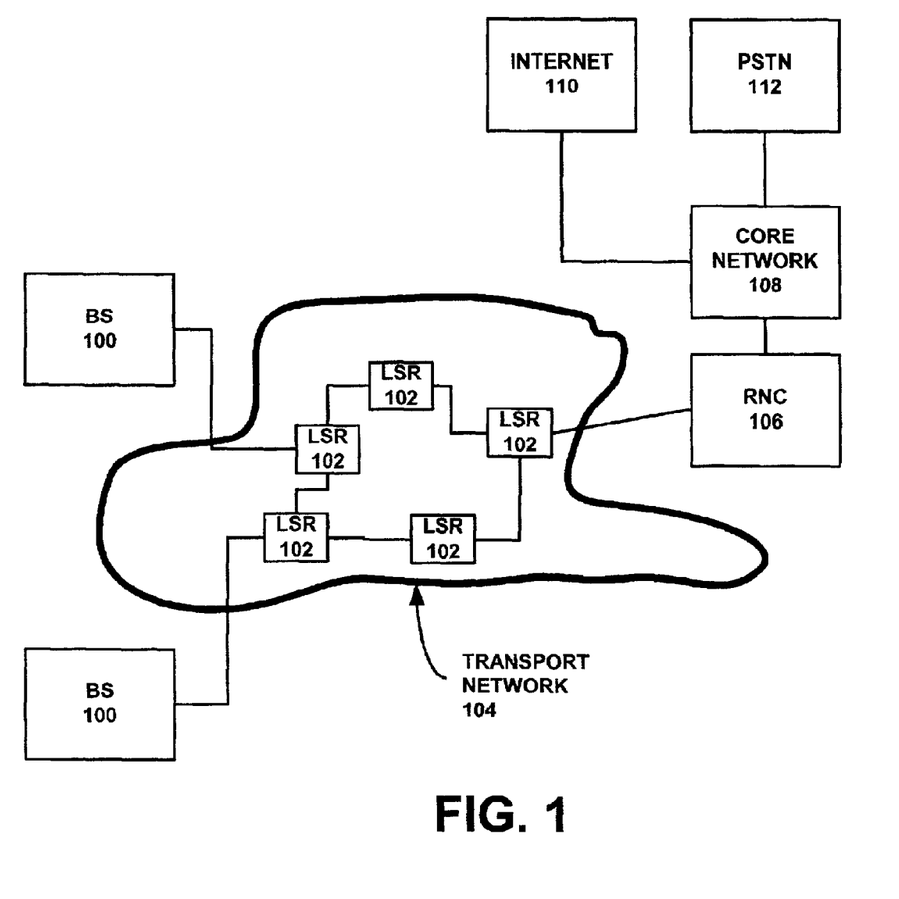
FIG. 1 depicts a general architecture for various radio access networks used with the present invention.

This present invention implements an IP transport concept for various radio access networks, including 3G-RAN (UTRAN and GERAN) and IP-RAN. A general architecture for the various radio access networks is shown in FIG. 1. WCDMA UTRAN is used as an example to illustrate the concept. However, the concept is flexible and adaptive so that it can be applied to other RANs, such as GERAN, IP-RAN, etc. In the depicted radio access network base stations 100 are connected via label switching routers 102 in a transport network 104 to radio network controller 106. The radio network controller 106 is connected to a core network 108, which in turn is connected to other networks, such as the Internet 110 or a PSTN (public switched telephone network) 112. For sending information across the transport network 104, the information is contained in payload portions of IP packets, the payload portion being radio protocol frames.

The fundamental concept of UMTS/IMT-2000 is the separation of the access functionality from the core network functionality. The radio access network provides an access platform for mobile terminals, such as base stations 100 to all core networks, such as core network 108, and network services. It hides all radio-access-technology-dependent and mobility functions from the core network 108. The two types of radio access networks currently in the scope of 3GPP are UMTS Terrestrial Radio Access Network (UTRAN) and GSM/EDGE Radio Access Network (GERAN), based on WCDMA and EDGE radio access technologies, respectively.

In 3G radio access networks a transport technology interconnects the network elements, e.g., base stations (BSs) 100 and radio network controllers (RNCs) 106. The diverse QoS requirements of the applications themselves (such as real time or non real time) combined with the requirements imposed by advanced radio control functions (such as soft handover and power control in CDMA systems) require that the transport technologies can provide differentiated quality of services to multiple classes of traffic. The transport bearers need to support a variety of QoS requirements (delay, jitter, packet loss, etc.) and traffic characteristics (streaming, bursty, etc.). Other transport requirements include efficiency (i.e. reduction in protocol overhead), in-sequence packet delivery and connection identification of the air interface channels.

At an ingress node (first label switch router of the label switch routers (LSRs) 102) of an MPLS-capable domain (transport network 104), IP packets are classified and routed based on a combination of the information carried in the IP header and the local routing information maintained by the LSRs 102. An MPLS header is inserted for each packet. Within an MPLS domain, packets are forwarded based on the labels. Packets having the same label follow the same path from ingress node to egress node (last label switch router of the label switch routers 102). This path is called Label Switched Path (LSP). The intermediate LSRs 102 perform label swapping by changing an incoming label to a new outgoing label and forwarding the packet to the next hop, as described in a specific database called Next Hop Label Forwarding Entry (NHLFE). At the egress node of the MPLS domain, the label is removed and the packet is passed to the RNC 106 for further processing. Thus, the IP header has to be processed only at the ingress and egress nodes, which simplifies and speeds up the packet forwarding operation.

Each MPLS packet has a header that is either encapsulated between the link layer and the network layer, or resides within an existing header, such as virtual path/channel identifier (VPI/VCI) pair within ATM. At most, the MPLS header will contain a label, TTL field, Class of Service (CoS) field, stack indicator, next header type indicator, and checksum. The benefits of MPLS can be summarized as simplified forwarding, explicit routing, traffic engineering and support of QoS. Inventively, the radio protocol frames are encapsulated as the payload in the MPLS packets.

In order to control the paths of LSPs in the transport network 104 effectively, each LSP can be assigned one or more attributes which can be considered in computing the path. They are summarized as follows: bandwidth refers to the minimum requirement on the reservable bandwidth of a path for the LSP to be set along that path; path attributes refer to decisions as to whether the path of the LSP should be manually configured or dynamically computed by constrained-based routing; setup priority refers to decisions as to which LSP will get the resources when multiple LSPs compete; holding priorities refers to decisions as to whether an established LSP should be preempted for the resource it holds by a new LSP; adaptability refers to decisions as to whether to switch the LSP to a more optimal path when one becomes available; resilience refers to decisions as to whether to reroute the LSP when the current path is affected by failure; and affinity refers to an administratively specified property.

These attributes can be used together with constraint-based routing (CBR) in order to compute paths for the LSPs. Both offline CBR and online CBR can be used in the RAN transport network. With offline CBR, a server computes paths for LSPs periodically (e.g. hourly, daily). LSPs are then configured to take the computed paths. Offline CBR is used to establish and manage LSPs on a longer time scale (e.g. daily). In principle, online CBR can be used to recompute routes dynamically in response to bandwidth changes of LSPs and link failures. For instance, the need for bandwidth change can be due to an increase in the amount of traffic of certain BSs 100.

The following description of MPLS network principles and operation is provided to understand the implementation of the present invention in the MPLS environment in a radio access network. The focus of QoS support in MPLS networks is scalability. This is achieved by flow aggregation that ensures individual end-to-end QoS guarantees without maintaining state information about individual flows on each segment of the path. This satisfies the requirement to provide differentiated QoS to multiple classes of traffic in the RAN. Diffserv mechanisms are good candidates to provide QoS within MPLS networks because services are based on a per-hop model and aggregate forwarding resources that are allocated in the LSRs for each service. Functions such as classification, marking and policing are only necessary at the edge LSRs, while core LSRs need only have PHB classification. There are two types of LSPs, the E-LSPs and the L-LSPs.

The general operation of DiffServ in an E-LSPs based MPLS domain is analogous to DiffServ in a non-MPLS network in the sense that the Per-Hop Behavior of the packet is based entirely on the encoded EXP field. In other words, instead of setting/reading DiffServ code point from the TOS field in IP header, it is set/read from the EXP field in the MPLS header. The EXP field is only 3-bits long and therefore a single E-LSP can support only up to 8 QoS classes. The mapping from EXP field to PHB (i.e. to PSC and drop precedence) for a given such LSP, is either explicitly signaled at label set-up or in reliance on a pre-configured mapping. The signaling can also be used to make bandwidth reservations for the E-LSP. One drawback of E-LSPs is that it can support only 2 QoS classes in the ATM domain, because the QoS treatment can be coded only in the Cell Loss Priority (CLP) bit in the ATM header.

The L-LSPs are used when more than 8 QoS classes (or more than 2 QoS classes with ATM) have to be supported. With L-LSPs this is accomplished by establishing a separate LSP for each QoS class between two MPLS capable neighbor nodes. In this approach the QoS treatment of the packet is not based only on the EXP field in the MPLS header (there is not an EXP-field with ATM nodes), but on incoming label plus some other information either in the MPLS header or in the data link layer header. For example, with ATM, the QoS class is coded in the VPI/VCI field plus in the CLP bit. In order for the receiving node to know which QoS class the received packet belongs to, this information has to be signaled between nodes. This is accomplished by using either LDP or RSVP. Thus, in addition to the label, the LDP/RSVP message has been extended to contain information of QoS treatment of the packet marked with a particular label. The receiving node has to store this information in order to guarantee proper treatment of the labeled packet.

Figure 2:
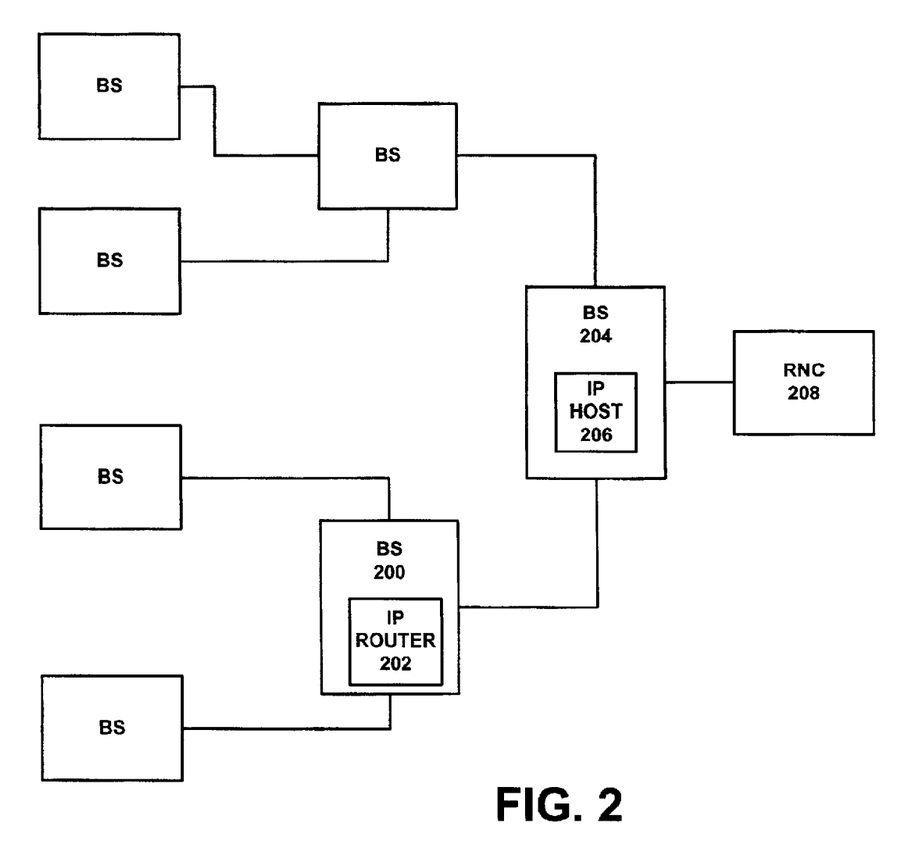
FIG. 2 depicts one type of layout and topology of the radio access network.

The present invention can be utilized in radio access networks wherein layout and topology give rise to different scenarios for the implementation of IP-based transport services. In the first scenario, the transport network provides service only to UTRAN, i.e. dedicated transport network. As shown in FIG. 2, the intermediate BSs 200 are equipped with IP routers 202, and the end BS 204 with IP hosts 206. The BS 204 is connected to the RNC 208. In this scenario, there is no crossover traffic from other applications.

Figure 3:
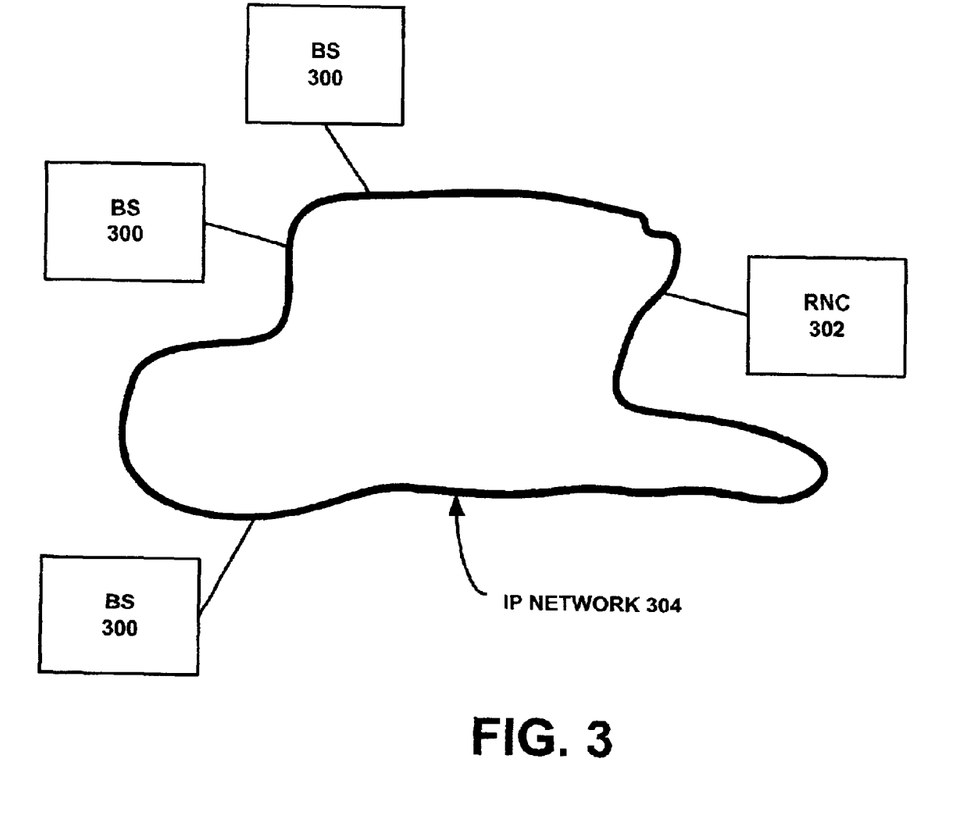
FIG. 3 depicts another type of layout and topology of the radio access network.

In the second scenario, the transport network provides services to both UTRAN and other users, i.e. shared transport network. As shown in FIG. 3, BSs 200 and RNC 202 are interconnected via a multiservice IP transport network 304, or an IP "cloud". The IP transport network 204 is deployed to carry the traffic of UTRAN, as well as the traffic of other applications.

Figure 4:
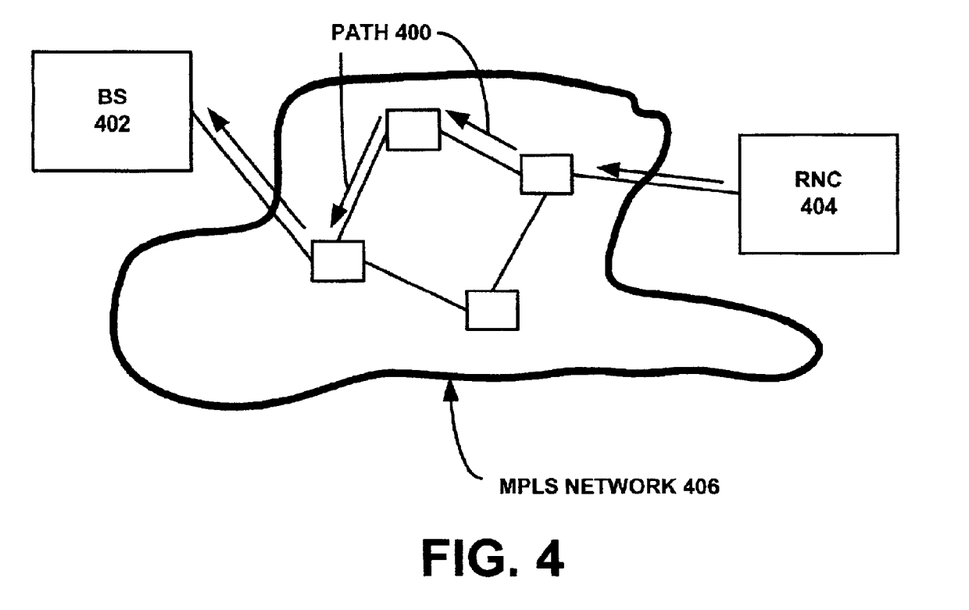
FIG. 4 depicts an embodiment of the present invention that uses label switching in a network supporting MPLS.

Referring now to FIG. 4, in one embodiment of the present invention UTRAN transport is implemented using label switching in a network supporting MPLS. This is in contrast to the scheme in which the UTRAN transport is provided by normal IP packet forwarding. In other words, "paths" 400 are established to interconnect BS 402 and RNC 404. Such "paths" 400 in an MPLS network 406 are the label switched paths (LSPs). After the LSP setup, the packets carrying radio frames are labeled at the ingress of the network and forwarded along the path using label switching. The advantage of this concept is that it can support built-in QoS.

The scheme can be described in two parts: the first part focuses on the setup and management of the LSPs 400; the second part describes how to send the packets over the LSPs 400. Without loss of generality, this section focuses on the case in which LSPs 400 are set up between BSs 402 and RNC 404. The transport from RNC 404 to BS 402 (downlink), and from BS 402 to RNC 404 (uplink) is implemented by separate LSPs. The downlink and uplink transport networks can be viewed as two separate virtual networks, which provide flexibility in accommodating the asymmetric traffic for the two directions.

For illustration purposes, the following describes the downlink direction (uplink works in a similar way). For each BS 402 at least one LSP 400 is set up for carrying the aggregated traffic of the BS 402. In 3G-RAN the traffic of a BS 402 is likely to comprise multiple classes, with different transport requirements. An example of that is UMTS traffic classes, i.e. conversational, streaming, interactive and background. Another example is the transport channels on WCDMA air interface which support soft-handover (e.g. dedicated channels, or DCH), and those which do not support soft handover (e.g. some common channels, or CCH). Yet another example is the transport channels, which require closed-loop power control (e.g. Dedicated Channels, Downlink Shared Channels, or DSCH, and Common Packet Channel, or CPCH) and those which do not require closed-loop power control (e.g. Forward Access Channel, or FACH, and Random Access Channel, or RACH). The diverse QoS requirements of the applications themselves (such as real time or non real time) combined with the requirements imposed by advanced radio control functions (such as soft handover and power control in CDMA systems) means that the MPLS transport technology needs to provide differentiated quality of services to multiple classes of traffic.

Figure 5:
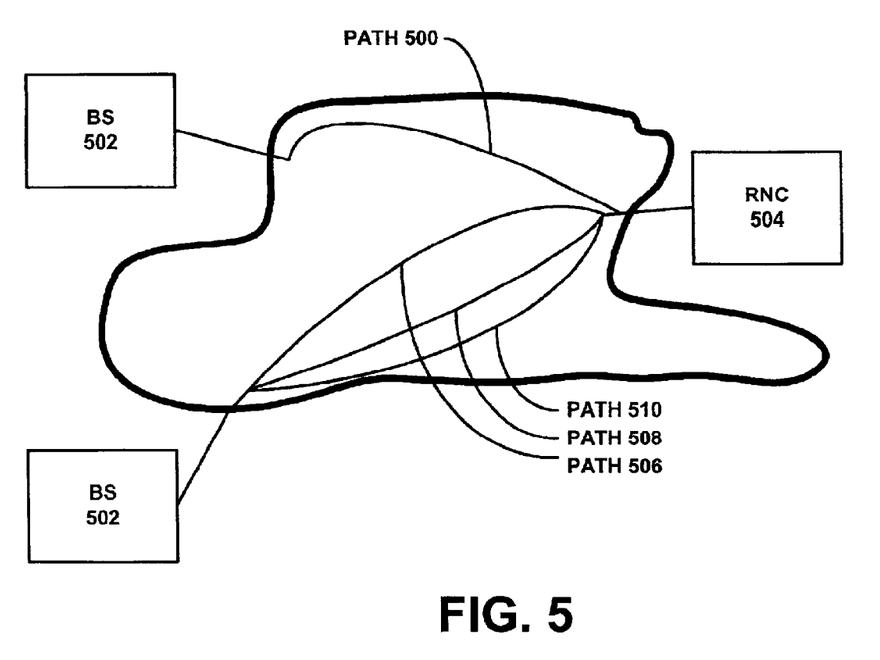
FIG. 5 depicts two approaches to provide differentiated QoS in an MPLS-based transport network for 3G-RANs.

There are two approaches to provide differentiated QoS in an MPLS-based transport network for 3G-RANs (see FIG. 5). The first one is to use a single LSP 500 to connect each BS 502 to the RNC 504. Multiple classes of traffic of a BS 502 are carried within one LSP 500. QoS differentiation is provided by packet marking and per-hop behavior (PHB) forwarding based on the CoS field of the header. The second one is to use multiple LSPs 506, 508, 510 to connect each BS 502 to the RNC 504. Each LSP 506, 508, 510 carries one class of traffic, i.e. class-based LSPs. In order to meet the transport QoS requirements of 3G-RAN, one embodiment of the present invention implements constraint-based routing to compute routes for LSPs. As mentioned earlier, an LSP can be assigned one or more attributes, such as bandwidth, set-up priority, holding priority and so on. In the simplest case, constraint-based routing computes LSP paths subject to bandwidth constraints alone. The basic rule is that the paths are selected such that the sum of bandwidths of all the LSPs on a link is less than the maximum reservable bandwidth of that link.

In general, MPLS used in the present invention does not have to be tied with constraint-based routing. It can be used with any routing protocols, such as OSPF. The LSPs can be set up without bandwidth reservation. However, establishing LSPs routed by constraint-based routing using bandwidth as the main constraint is a straighforward and meaningful option. Since an LSP needs to carry the aggregate traffic of a BS 502, either for all the classes (in the single-LSP approach 500), or for a single class (in the multi-LSP approach 506, 508, 510), assigning a bandwidth to the LSP is needed. On the other hand, the bandwidth of an LSP can be adjusted, in response to the traffic and QoS requirements of an BS 502.

In one embodiment a single LSP (see path 500 in FIG. 5) is set up to connect each BS to the RNC. The aggregated traffic of a BS, including all the classes, is carried within one LSP. At the ingress LSR of the LSPs the CoS field of the MPLS header is marked based on the traffic classes. Packets are buffered and scheduled based on the CoS field of the header in all the routers along the LSP. This embodiment can be implemented based on the E-LSP scheme and allocates bandwidth resources in the transport network on a per BS basis. It requires fewer LSPs than the one with multiple LSPs for each BS. In addition, it offers more flexibility in inter-class resource sharing. Sharing the allocated bandwidth between different traffic classes within a BS can be based on the DiffServ policy implemented at the LSRs.

In another embodiment multiple LSPs (see paths 506, 508, 510 in FIG. 5) are set up to connect each BS to the RNC, each LSP carrying one class of traffic, i.e. LSPs are class-specific. At the ingress of the MPLS transport network, the packets are mapped onto different LSPs based on their traffic classes. QoS differentiation is not required within the LSPs. The LSPs for different traffic classes will be assigned different attributes, such as bandwidth, priority, adaptability and so on. This embodiment can be implemented based on the L-LSP scheme and allows finer granularity resource control than the one with single LSP per BS. It allocates bandwidth resources in the transport network on a per class basis.

The QoS differentiation is provided by adjusting the attributes of LSPs for different classes, such as bandwidth. For example, more bandwidth resources can be allocated to the premium class LSPs to meet the stringent QoS requirements. Premium class LSPs will also have higher priority in getting backup resources in case of link or router failure. These can be implemented by offline or online constraint-based routing. This provides better separation between different classes and more protection of premium class traffic.

In a 3G-RAN transport network based on MPLS, the provisioning of transport network resources can be implemented in two levels: LSP bandwidth provisioning and transport network level provisioning.

The objective of LSP bandwidth provisioning is to find out the required bandwidth of an LSP connecting a BS to the RNC. The required bandwidth depends on the aggregated traffic of a BS (or a class), the UTRAN transport QoS requirements, the Diffserv policy implemented within an LSP (if any), radio interface protocol, transport layer protocol, etc. This can be done using simulation tools.

The objective of network level provisioning is to find out how much bandwidth should be reserved on each link such that bandwidth constraints of all the LSPs are satisfied. The procedure of provisioning is as follows: routes for LSPs are computed using CBR subject to bandwidth constraints, i.e., the sum of required bandwidths for all the LSPs on a link should be less than the total reservable bandwidth on the link. If it is not possible to satisfy all the bandwidth constraints, then the total reservable bandwidth on the bottleneck links is increased. Routes for LSPs are then recomputed using CBR. The process is iterated until all the bandwidth constraints in the MPLS transport network are satisfied.

Figure 6:
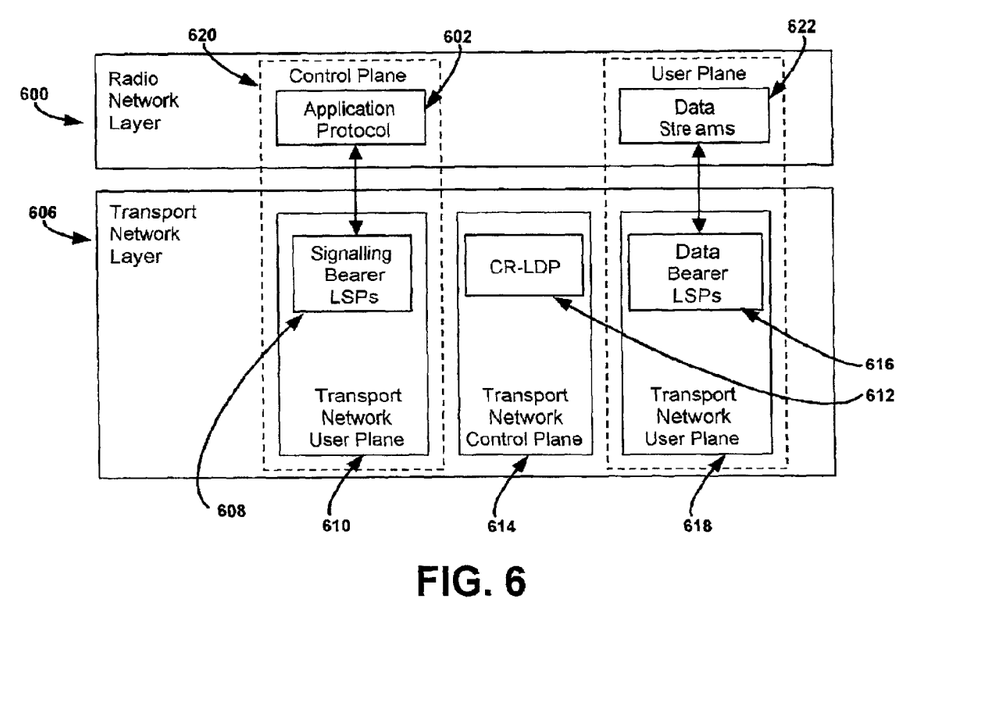
FIG. 6 depicts the protocol model for the present invention.

The diagram depicted in FIG. 6 describes the protocol model for the UTRAN interface, and shows the radio network layer 600 having the application protocol 602 and the data streams 622. It also shows the transport layer 606 having the signalling bearer LSPs 608 in the transport network user plane 610, the CR-LDP 612 in the transport network control plane 614, and the data bearer LSPs 616 in the transport network user plane 618. The transport network layer 606 is based on MPLS. The user plane data streams 622 and control plane application protocol 602 are carried by the data bearer LSPs 616 and the signaling bearer LSPs 608, respectively.

The control plane 614 of the transport network layer 606 is responsible for setting up and managing the data bearer LSPs 616 in the user plane 618. Constraint-based routing label distribution protocol (CR-LDP) is used to set up data bearer LSPs 616 based on bandwidth constraints. An additional layer of protocol is used on top of the data bearer LSPs 616 to carry out such functions like multiplexing, segmentation, and scheduling of the radio frames. This protocol only needs to reside within the BS and RNC, i.e. not present in the LSPs. The protocol can be like PPP in the sense that LSPs create a virtual "point-to-point" link within a routed MPLS network.

Figure 7:
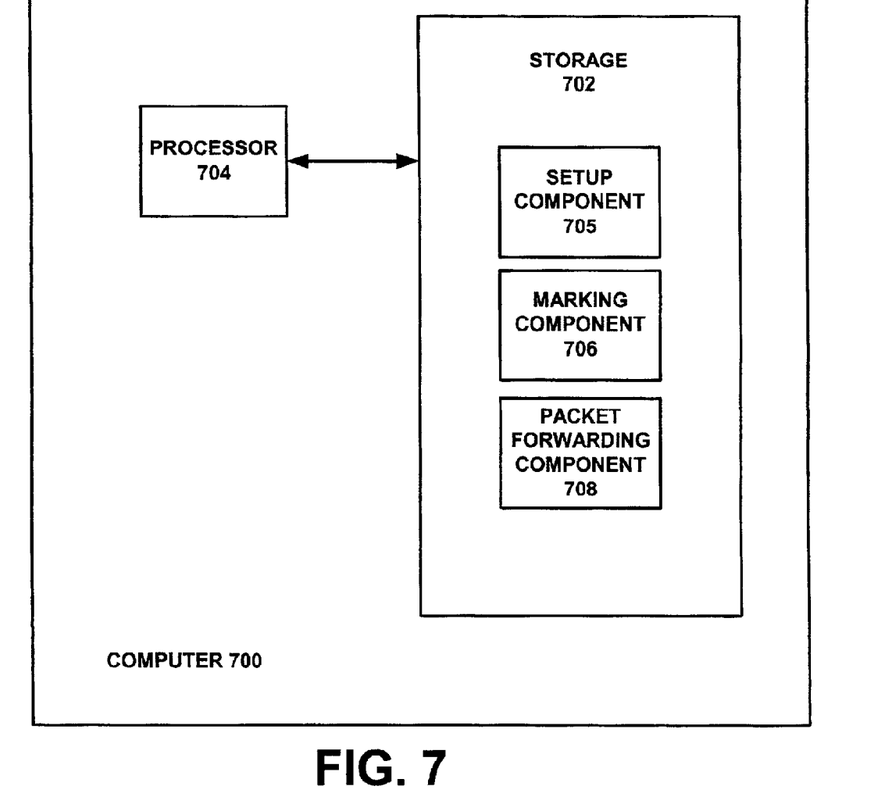
FIG. 7 depicts in general form the system of the present invention.
Figure 8:
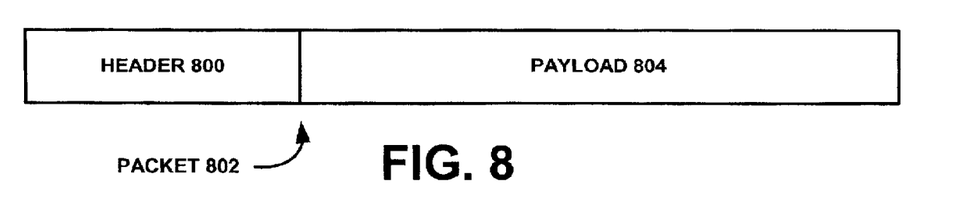
FIG. 8 depicts a header associated with an MPLS packet carrying a payload, such as radio protocol frames.

FIG. 7 depicts in general form the system of the present invention for providing differentiated QoS (quality of service) in an MPLS (multiprotocol label switching) based transport network for 3G-RAN (third generation radio access network). A computer 700 includes a storage 702 for storing data and instructions and a processor 704 for executing instructions stored in the storage 702. The storage contains instructions corresponding to: a setup component 705 that establishes single or multiple label switching paths having at least one label switching router, the label switching path connecting a base station to a radio network controller, a respective one of the base station and radio network controller having a plurality of traffic classes of traffic; a marking component 706 that marks a CoS field of an MPLS header at a label switch router at an ingress to the label switching path to identify the traffic classes of traffic being carried by the respective one of the base station and radio network controller; and a packet forwarding component 708 that forwards the traffic within the label switching path based on the marked CoS field. As depicted in FIG. 8, a header 800 is associated with a packet 802 carrying a payload 804, such as radio protocol frames. The header 800 is marked for label switching at the ingress to the label switching path.

Figure 9:
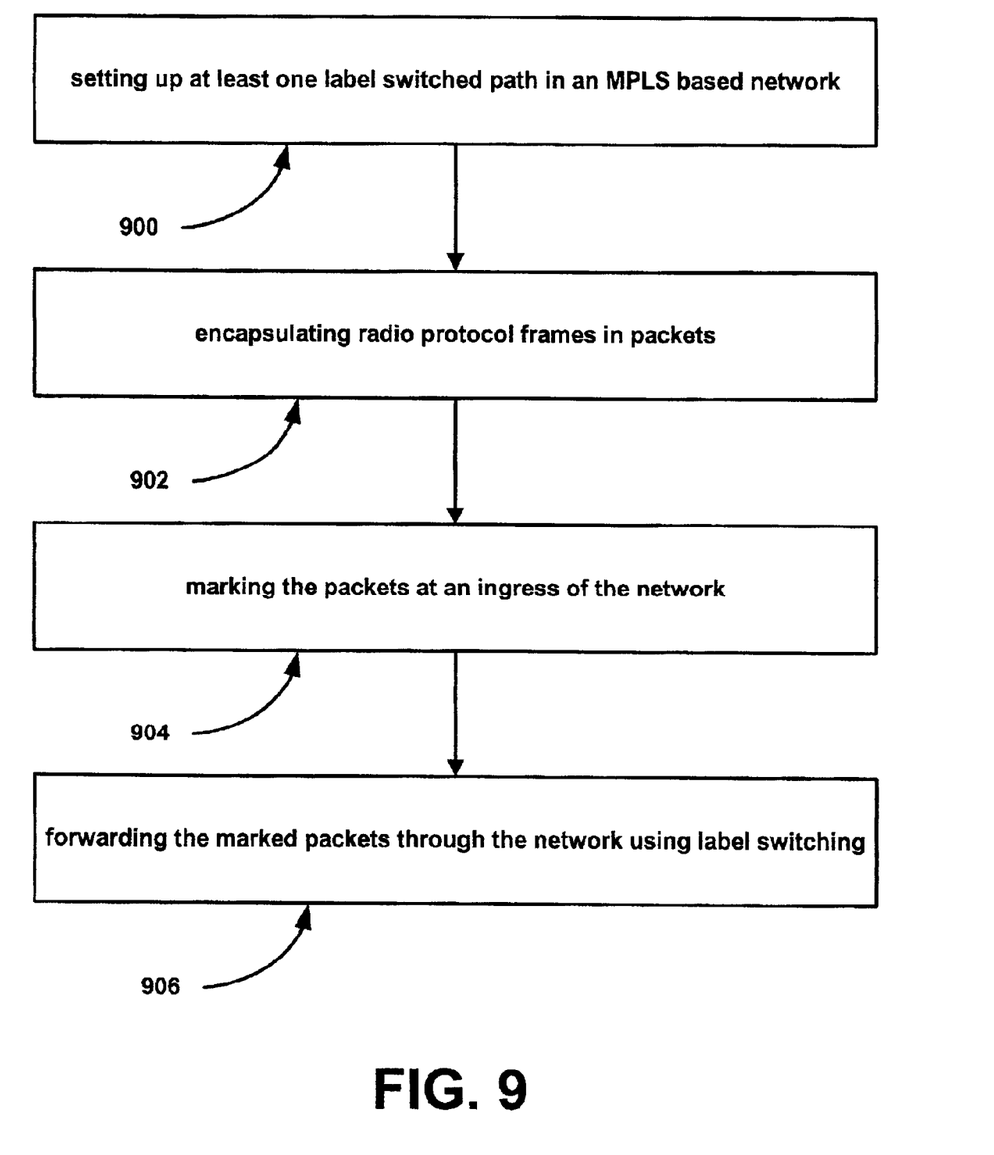
FIG. 9 depicts in general terms the method of transporting information in radio protocol frames in an MPLS based transport network for 3G-RAN.

FIG. 9 depicts in general terms the method of transporting information in radio protocol frames in an MPLS based transport network for 3G-RAN. In step 900 at least one label switched path is set up in the network using, for example, constraint based routing. In step 902 radio protocol frames are encapsulated in MPLS packets. In step 904 the packets are marked at an ingress to the network. For example, the headers are marked for label switching. In step 906 the marked packets are forwarded through the network using label switching.

Figure 10:
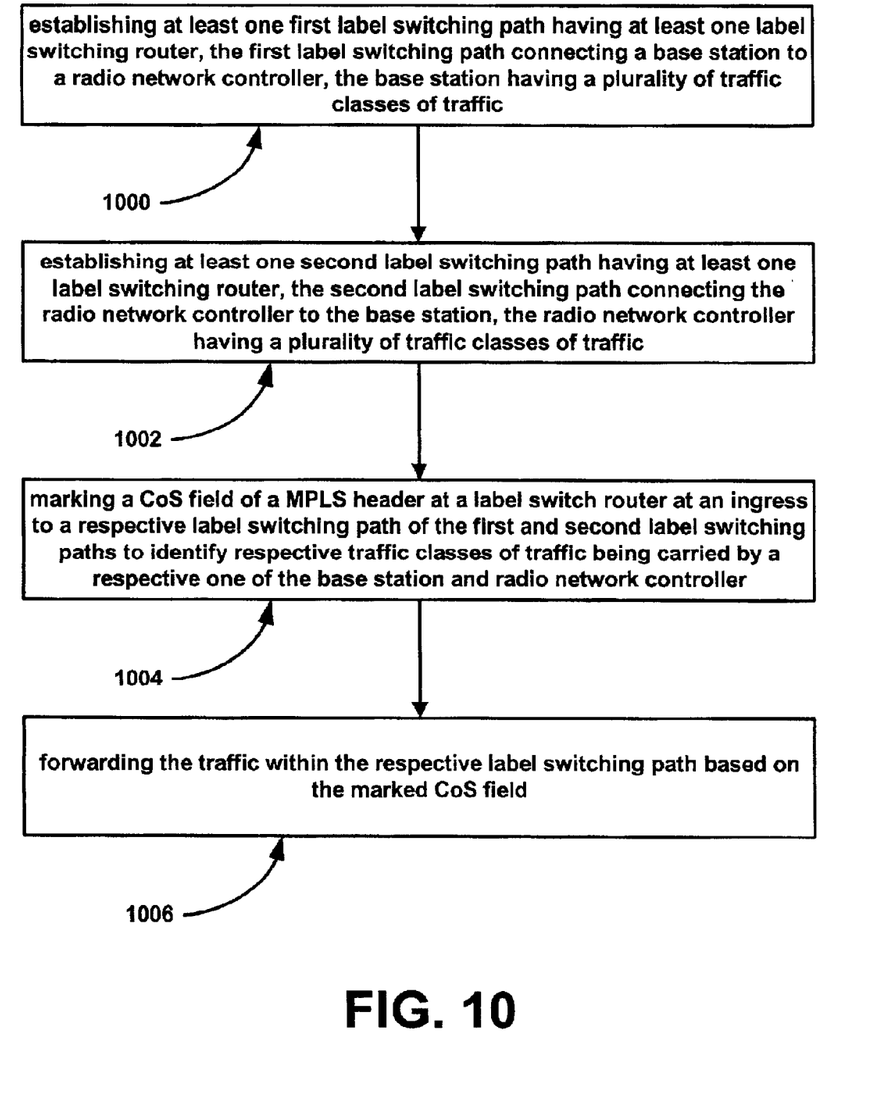
FIG. 10 depicts an embodiment of the inventive method of providing differentiated QoS in an MPLS based transport network for 3G-RAN.

FIG. 10 depicts an embodiment of the inventive method of providing differentiated QoS in an MPLS based transport network for 3G-RAN. In step 1000 single or multiple first label switching paths are established having at least one label switching router, the first label switching path connecting a base station to a radio network controller, the base station having a plurality of traffic classes of traffic. In step 1002 single or multiple second label switching paths are established having at least one label switching router, the second label switching path connecting the radio network controller to the base station, the radio network controller having a plurality of traffic classes of traffic. In step 1004 a CoS field of a MPLS header in marked at a label switch router at an ingress to a respective label switching path of the first and second label switching paths to identify respective traffic classes of traffic being carried by a respective one of the base station and radio network controller. In step 1006 the traffic within the respective label switching path is forwarded through the network based on the marked CoS field.

This invention presents an IP/MPLS-based transport scheme that can provide reliable, secure and efficient transport bearers, which support a variety of QoS requirements. In addition to 3G radio access networks such as UTRAN, GERAN, and 3GPP2 RAN, it can be also be applied to other types of radio access networks, including but not limited to IP-based radio access network (IP-RAN), as well as Future IP Mobility Network Architecture (FIMoNA).

As described above the present invention is based on IP transport technology with the enhancement of MPLS and overcomes drawbacks of prior art systems. It has a number of advantages as compared to the ATM/AAL2 based transport scheme: IP as a network layer protocol is independent from link/physical layers, allowing a flexible selection of lower layer technologies, including options of IP over radio layer or IP over optical layer, etc. This enables truly scalable, adaptive, and dynamically reconfigurable and expendable 3G radio access networks.

In 3G radio access networks using IP-based transport technology the present invention provides consistent backbone infrastructure, operational efficiency and industry standard operation, and administration and management. This provides cost effective solutions to the deployment and expansion of 3G radio access networks. In the inventive IP/MPLS based transport scheme, flexible and dynamic bandwidth allocation in the transport network for deploying scalable 3G RANs is implemented.

By using one or multiple LSPs for carrying the aggregated traffic of one BS, scalability is provided to support a large number of users per base station without overloading the IP/MPLS routers in the RAN transport network. New on-demand LSPs can be set up if existing LSPs are reaching their capacity limits. The RNCs and BSs can collect statistics of prior calls and data types to do bandwidth management in the existing LSPs, or set up new LSPs if a certain bandwidth threshold is reached. This allows proactive resource allocation in the transport network as the traffic per BS grows. Furthermore, LSPs can be used for traffic load distribution. For example, if one RNC is overloaded with heavy traffic, new LSPs can be set up to direct some traffic to other RNCs that are lightly loaded. This enables optimal utilization of transport network resources. Using per-LSP bandwidth allocation and constraint-based routing, the inventive scheme also greatly facilitates the dimensioning and provisioning of transport network resources for the RANs, which are critical to fast 3G radio access network planning and deployment.

In the inventive IP/MPLS based transport scheme, reliable transport bearers can be provided using protection and restoration mechanisms in MPLS technology, such as online constraint-based rerouting when node/link failure occurs. By encapsulating radio protocol frames in the label switched packets with localized MPLS headers, secure transport bearers can be provided. The method of the present invention can also incorporate differentiated services schemes. Here, transport bearers are provided that can support a variety of QoS requirements (delay, loss ratio, etc.) and traffic characteristics (streaming, bursty, etc.).

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method of providing differentiated QoS (quality of service) in an MPLS (multiprotocol label switching) based transport, comprising the steps of:

establishing a single first label switching path having at least one label switching router, the first label switching path being a connection between a base station and a radio network controller, the base station having a plurality of traffic classes of traffic;

establishing a single second label switching path having at least one further label switching router, the second label switching path being a connection between the base station and the radio network controller, the radio network controller having a plurality of traffic classes of traffic;

assigning each label switching path at least one attribute in order to provide differentiated QoS to the plurality of traffic classes;

marking a field of an MPLS header at a label switch router at an ingress to a respective label switching path of the first and second label switching paths to identify respective traffic classes of traffic being carried by a respective one of the base station and radio network controller; and forwarding the traffic within the respective label switching path based on the marked field.

2. The method according to claim 1, wherein the method further comprises using constraint based routing to establish a respective label switching path.

3. The method according to claim 1, wherein the MPLS header is associated with a packet carrying radio protocol frames, and wherein the packets are forwarded along a respective label switching path using label switching.

4. The method according to claim 1, wherein the method further comprises encapsulating a payload in MPLS packets that form the traffic.

5. A method of providing differentiated QoS (quality of service) in an MPLS (multiprotocol label switching) based transport network, comprising the steps of:

establishing first multiple label switching paths, each of the first label switching paths having at least one label switching router, and each of the first label switching paths connecting a base station to a radio network controller, the base station having a plurality of traffic classes of traffic;

establishing second multiple label switching paths, each of the second label switching paths having at least one label switching router, and each of the second label switching paths connecting the radio network controller to the base station, the radio network controller having a plurality of traffic classes of traffic;

marking a field of an MPLS header at a respective label switch router at an ingress to a respective label switching path of the first and second multiple label switching paths, such that each respective label switching path carries a different respective traffic class of the plurality of traffic classes;

assigning each label switching path at least one attribute in order to provide differentiated QoS to the multiple classes of traffic; and forwarding the traffic within the label switching paths based on the marked field.

6. The method according to claim 5, wherein the method further comprises using constraint based routing to establish the label switching path.

7. The method according to claim 5, wherein the MPLS header is associated with a packet carrying radio protocol frames, and wherein the packets are forwarded along the path using label switching.

8. The method according to claim 5, wherein the method further comprises encapsulating a payload in MPLS packets that form the traffic.

9. A system for providing differentiated QoS (quality of service) in an MPLS (multiprotocol label switching) based transport network, comprising:

a computer including a storage for storing data and instructions and a processor for executing instructions stored in the storage, the storage containing instructions corresponding to:

a setup component that establishes multiple label switching paths, each of the label switching paths having at least one label switching router, and each of the label switching paths connecting a base station to a radio network controller, a respective one of the base station and radio network controller having a plurality of traffic classes of traffic, and wherein each label switching path has assigned thereto at least one attribute in order to provide differentiated QoS to multiple classes of traffic;

a marking component that marks a field of an MPLS header at a respective label switch router at an ingress to a respective label switching path of the multiple label switching paths, such that each respective label switching path carries a different respective traffic class of the plurality of traffic classes; and a packet forwarding component that forwards the traffic within the label switching paths based on the marked field.

10. The system according to claim 9, wherein the MPLS header is associated with a packet carrying radio protocol frames.

11. The system according to claim 9, wherein a payload is encapsulated in MPLS packets that form the traffic.

12. The system of claim 9, wherein the computer comprises a network node.

13. The system of claim 12, wherein the network node comprises an ingress node.

14. The system of claim 12, wherein the network node comprises a base station.

15. The system of claim 12, wherein the network node comprises a label switching router.

16. A computer readable medium storing computer executable instructions for performing a method of providing differentiated QoS (quality of service) in an MPLS (multiprotocol label switching) based transport network, comprising the steps of:

establishing first multiple label switching paths, each of the first label switching paths having at least one label switching router, and each of the first label switching paths connecting a base station to a radio network controller, the base station having a plurality of traffic classes of traffic;

establishing second multiple label switching paths, each of the second label switching paths having at least one label switching router, and each of the second label switching paths connecting the radio network controller to the base station, the radio network controller having a plurality of traffic classes of traffic;

marking a field of an MPLS header at a respective label switch router at an ingress to a respective label switching path of the first and second multiple label switching paths, such that each respective label switching path carries a different respective traffic class of the plurality of traffic classes;

assigning each label switching path at least one attribute in order to provide differentiated QoS to multiple classes of traffic; and forwarding the traffic within the label switching paths based on the marked field.

17. The computer readable medium according to claim 16, wherein the stored method further comprises using constraint based routing to establish the label switching path.

18. The computer readable medium according to claim 16, wherein the MPLS header is associated with a packet carrying radio protocol frames, and wherein the packets are forwarded along the path using label switching.

19. The computer readable medium according to claim 16, wherein the stored method further comprises encapsulating a payload in MPLS packets that form the traffic.

* * * * *

UNITED STATES PATENT AND TRADEMARK OFFICE
CERTIFICATE OF CORRECTION

PATENT NO. : 6,950,398 B2
APPLICATION NO. : 09/934073
DATED : September 27, 2005
INVENTOR(S) : Yile Guo et al.

It is certified that error appears in the above-identified patent and that said Letters Patent is hereby corrected as shown below:

Column 11,
Line 46, replace "to the multiple" with -- to multiple --.

Signed and Sealed this

Twenty-seventh Day of June, 2006

JON W. DUDAS
*Director of the United States Patent and Trademark Office*